United States Patent
Provenza et al.

(10) Patent No.: US 9,889,827 B2
(45) Date of Patent: Feb. 13, 2018

(54) METHODS AND SYSTEMS FOR PREVENTING VEHICLE ROLL

(71) Applicant: GM GLOBAL TECHNOLOGY OPERATIONS LLC, Detroit, MI (US)

(72) Inventors: David A. Provenza, Shelby Township, MI (US); Michael A. Van Camp, Swartz Creek, MI (US); William A. Arnold, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 148 days.

(21) Appl. No.: 14/698,507

(22) Filed: Apr. 28, 2015

(65) Prior Publication Data

US 2016/0318489 A1    Nov. 3, 2016

(51) Int. Cl.
*B60T 7/12* (2006.01)
*B60T 13/74* (2006.01)

(52) U.S. Cl.
CPC ............ *B60T 7/12* (2013.01); *B60T 7/122* (2013.01); *B60T 13/74* (2013.01)

(58) Field of Classification Search
CPC ... B60T 7/12; B60T 7/122; B60T 8/88; B60T 8/885; B60T 8/92; B60T 13/74
See application file for complete search history.

(56) References Cited

U.S. PATENT DOCUMENTS

| | | | |
|---|---|---|---|
| 6,406,102 B1* | 6/2002 | Arnold | B60T 7/042 303/20 |
| 6,545,852 B1* | 4/2003 | Arnold | B60T 17/22 361/152 |
| 2007/0225117 A1* | 9/2007 | Shimizu | B60T 7/12 477/182 |
| 2007/0281827 A1* | 12/2007 | Shimizu | B60T 7/107 477/92 |
| 2010/0312424 A1* | 12/2010 | Yasui | F16H 61/12 701/22 |
| 2014/0024494 A1* | 1/2014 | Inoue | B60W 10/11 477/94 |
| 2014/0350806 A1* | 11/2014 | Koike | B60W 10/184 701/53 |
| 2016/0244039 A1* | 8/2016 | Rizzo | B60T 8/322 |

* cited by examiner

*Primary Examiner* — Jacob S. Scott
(74) *Attorney, Agent, or Firm* — Lorenz & Kopf, LLP

(57) ABSTRACT

Methods and systems are provided for preventing vehicle roll. In one embodiment, a method includes: determining a first switch state; determining a second switch state; evaluating the first switch state and the second switch state to determine whether a condition of a mechanical linkage between a range selection device and a transmission has occurred; and selectively generating at least one of a control signal to control an electronic park brake and a notification message based on the determination.

9 Claims, 3 Drawing Sheets

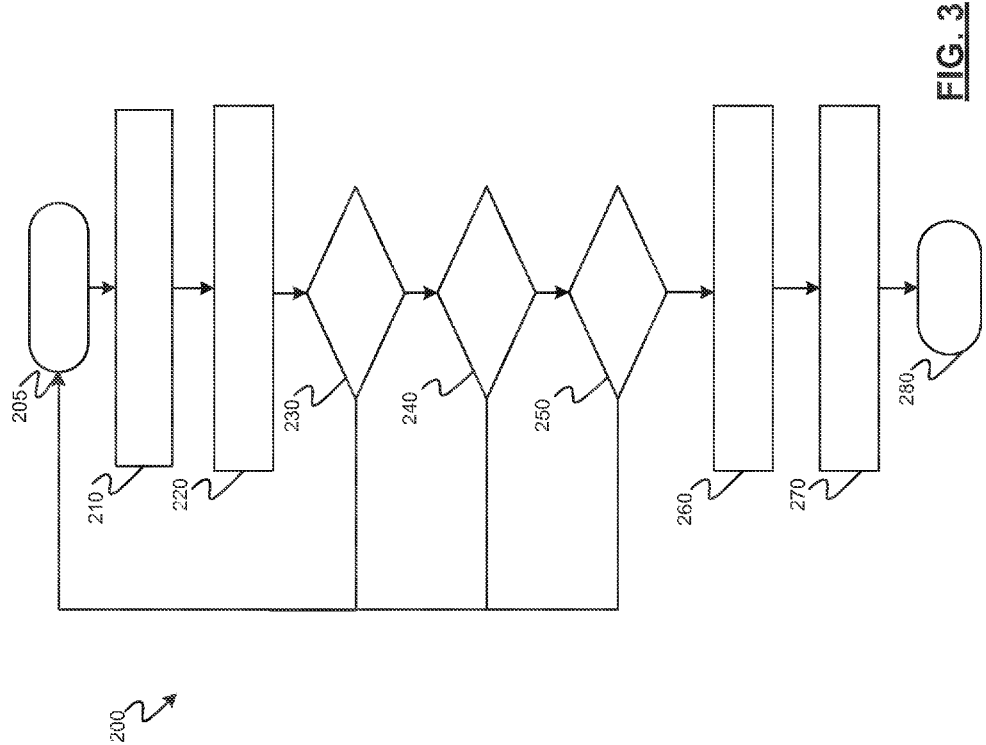

METHODS AND SYSTEMS FOR PREVENTING VEHICLE ROLL

TECHNICAL FIELD

The present disclosure generally relates to vehicles, and more particularly relates to methods and systems for controlling the vehicle to prevent vehicle movement.

BACKGROUND

Vehicles equipped with an automatic transmission often include a shift control lever mounted on a console, the dashboard, or the steering column of the vehicle. A vehicle operator may manually move the shift control lever between shift lever positions. The shift lever positions indicate particular transmission ranges (park, reverse, neutral, drive 1, drive 2, drive 3, etc.). Movement of the shift lever into a particular shift lever position causes the transmission to be operated in a particular gear or set of gears.

For example, the shift control lever includes mechanical linkages that couple to the automatic transmission. The mechanical linkages cause the automatic transmission to operate in the particular gear or set of gears. For example, when the shift control lever is moved to the park position, a mechanical linkage activates a parking pawl device or other device of the transmission. The parking pawl device locks the movement of the transmission output shaft thereby preventing movement of the vehicle wheels.

In some cases, conditions can occur in one or more of the mechanical linkages that prevent proper operation. The conditions can cause unexpected movement of the vehicle. For example, when the shift control lever is in the park position and when a condition exists in the mechanical linkage between the shift control lever and the transmission, the vehicle may roll forward or backward (referred to hereinafter as vehicle roll).

Accordingly, it is desirable to provide methods and systems for preventing vehicle roll. Furthermore, other desirable features and characteristics of the present invention will become apparent from the subsequent detailed description of the invention and the appended claims, taken in conjunction with the accompanying drawings and this background of the invention.

SUMMARY

Methods and systems are provided for preventing vehicle roll. In one embodiment, a method includes: determining a first switch state; determining a second switch state; evaluating the first switch state and the second switch state to determine whether a condition of a mechanical linkage between a range selection device and a transmission has occurred; and selectively generating at least one of a control signal to control an electronic park brake and a notification message based on the determination.

In another embodiment, a system includes at least two switch devices; and a control module. The control module receives switch data from the at least two switch devices, determines a first switch state based on the switch data from the first switch device, determines a second switch state based on the data from the second switch device, evaluates the first switch state and the second switch state to determine whether a condition of a mechanical linkage between a range selection device and a transmission has occurred, and selectively generates at least one of a control signal to control an electronic park brake and a notification message based on the determination.

In another embodiment, a vehicle is provided. The vehicle includes an automatic transmission having a transmission mode switch, a range selection device having a park switch, an electronic park brake system having an electronic park brake, and a control module. The control module receives switch data from the transmission mode switch and the park switch, determines a first switch state based on the switch data from the transmission mode switch, determines a second switch state based on the data from the park switch, evaluates the first switch state and the second switch state to determine whether a condition of a mechanical linkage between the range selection device and the transmission has occurred, and selectively generates at least one of a control signal to control an electronic park brake and a notification message based on the determination.

DESCRIPTION OF THE DRAWINGS

The present disclosure will hereinafter be described in conjunction with the following drawing figures, wherein like numerals denote like elements, and:

FIG. 3 is a flowchart of a method for preventing vehicle roll in accordance with exemplary embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
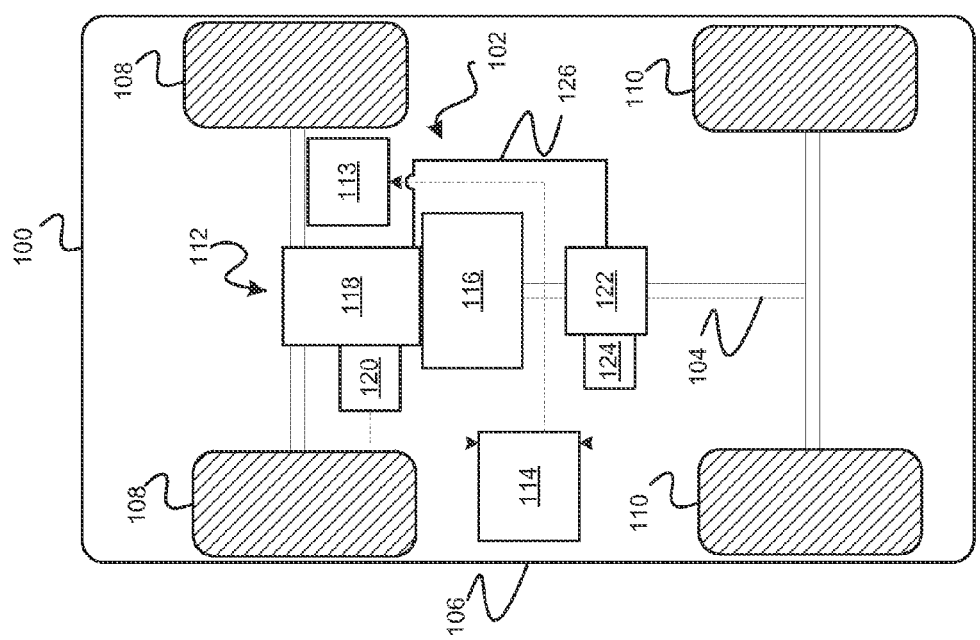
FIG. 1 is a functional block diagram of a vehicle that includes, among other features, a vehicle roll prevention system, in accordance with exemplary embodiments.

With reference to FIG. 1, a vehicle 100 is shown that includes a vehicle roll prevention system 102 in accordance with various embodiments. Although the figures shown herein depict an example with certain arrangements of elements, additional intervening elements, devices, features, or components may be present in an actual embodiment. It should also be understood that FIG. 1 is merely illustrative and may not be drawn to scale.

As depicted in FIG. 1, the vehicle 100 generally includes a chassis 104, a body 106, front wheels 108, rear wheels 110, a propulsion system 112, an electronic park brake system 113, and at least one control module 114. The body 106 is arranged on the chassis 104 and substantially encloses the other components of the vehicle 100. The body 106 and the chassis 104 may jointly form a frame. The wheels 108-110 are each rotationally coupled to the chassis 104 near a respective corner of the body 106. As can be appreciated, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

The propulsion system 112 generally includes an engine/motor 116 and a transmission 118. The engine/motor 116 may be any number of different types of propulsion devices, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor. The transmission 118 may be any number of different types of automatic transmissions that automatically change the gear ratios as the vehicle 100 is moving. In various embodiments, the transmission 118 includes a transmission mode switch 120. The transmission mode switch 120 generates mode signals. The mode signals indicate a bit encoding corresponding to states of circuits of the transmission mode switch 120. The control module 114 receives the mode signals and interprets the mode signals as a transmission mode switch state. The control module 114 controls engine operation and transmission shift patterns based on the interpreted transmission mode switch state.

The vehicle 100 further includes a range selection device 122 that is movable by a vehicle operator to a number of defined positions. Each position corresponds to a desired operating range of the transmission 118. In various embodiments, the desired positions include a park position, a reverse position, a neutral position, and one or more forward drive positions. In various embodiments, the range selection device 122 includes a park switch 124 that communicates park switch data to the control module 114. The control module 114 determines whether the range selection device 122 is in the park position based on the park switch state data.

In some instances, mechanical linkages 126 couple the range selection device 122 directly to the transmission 118 and cause the automatic transmission 118 to operate in the intended range. For example, a mechanical linkage 126 associated with the park position of the range selection device 122 causes the transmission 118 to operate in a park range.

In some instances, a condition may occur in the mechanical linkage 126 causing the transmission 118 to not operate in the intended range. For example, one or more cables and/or solid linkages of the mechanical linkage 126 can become detached from the interfaces at the transmission 118 and/or the range selection device 122. In another example, one or more cable core wires can fracture from corrosion and/or cyclic operation. As can be appreciated, other conditions may occur in the mechanical linkage 126, in various embodiments, causing the transmission to not operate in the intended range, as the disclosure is not limited to the present examples.

The control module 114 identifies the condition of the mechanical linkage 126 between the range selection device 122 and the transmission 118 and generates messages indicating the condition and/or controls the electronic park brake system 113 such that a vehicle roll does not occur. In general, the control module 114 monitors the state of the park switch 124 of the range selection device 122 and the switch state of the transmission mode switch 120 and identifies a condition in the mechanical linkage 126 based on a comparison of the two switch states. When the park switch state indicates a park position and the transmission mode switch state indicates a non-park position (e.g., neutral, reverse, drive 1, drive 2, drive 3, etc.), a condition is identified and a message is generated and/or the electronic park brake system 113 (if present on the vehicle 100) is controlled such that an electronic park brake is applied. Applying the electronic park brake prevents vehicle roll.

Figure 2:
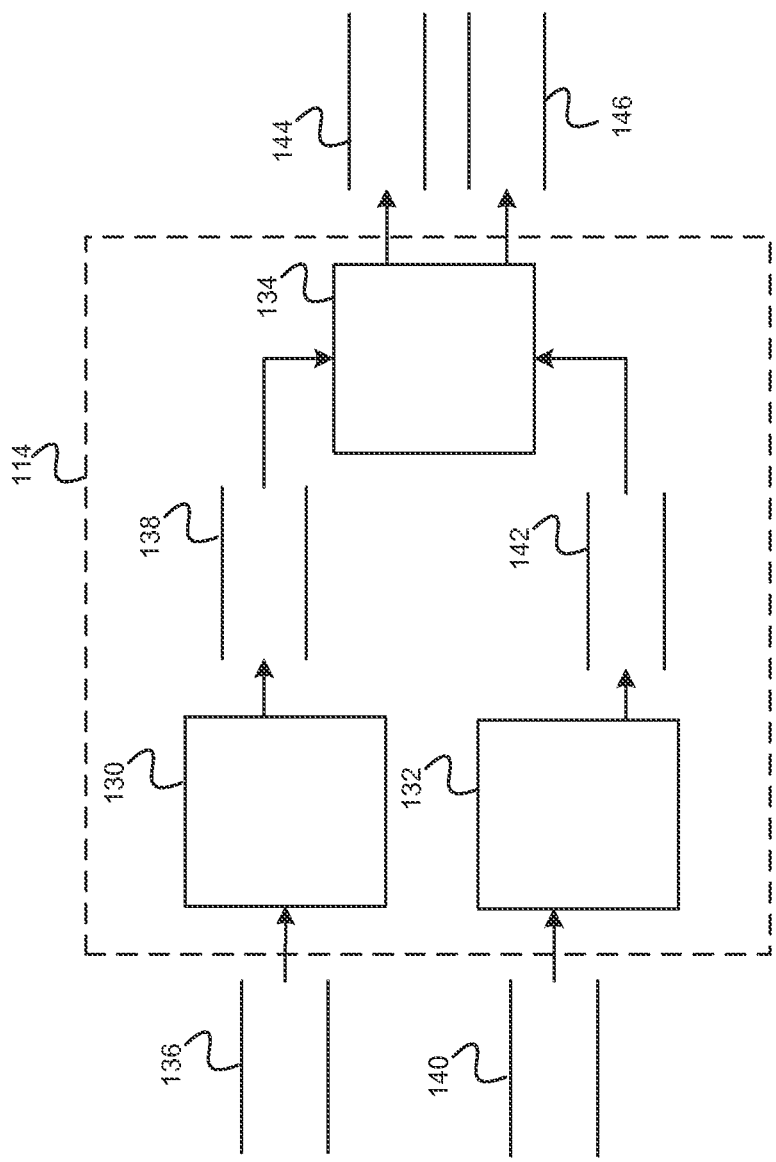
FIG. 2 is a functional block diagram of a control module of the vehicle roll prevention system in accordance with exemplary embodiments.

Referring now to FIG. 2 and with continued reference to FIG. 1, a dataflow diagram illustrates the control module 114 of FIG. 1 in accordance with various embodiments. As can be appreciated, various embodiments of the control module 114, according to the present disclosure, may include any number of sub-modules. For example, the sub-modules shown in FIG. 2 may be combined and/or further partitioned to similarly prevent a vehicle roll condition. As discussed above, inputs to the control module 114 may be received from sensors or switches, received from other control modules (not shown) within the vehicle 100, and/or determined by sub-modules (not shown) within the control module 114. In various embodiments, the control module 114 includes a park switch state determination module 130, a transmission mode switch state determination module 132, and an electronic park brake control module 134.

The park switch state determination module 130 receives as input data 136 from the park switch 124. The data 136 is evaluated to determine a park switch state 138. In various embodiments, the park switch state determination module 130 determines the park switch state 138 to be at least one of PARK, meaning the range selection device 122 is in the park position, and OTHER meaning the range selection device 122 is in a position other than the park position.

The transmission mode switch state determination module 132 receives as input data 140 from the transmission mode switch 120. The data 140 is evaluated to determine a transmission mode switch state 142. In various embodiments, the transmission mode switch state determination module 132 determines the transmission mode switch state 142 to be at least one of PARK meaning the range selection device 122 is in the park position, REVERSE meaning the range selection device 122 is in a reverse position, NEUTRAL meaning the range selection device 122 is in a neutral position, DRIVE 1 meaning the range selection device 122 is in a drive position, and any other values indicating a position of the range selection device 122.

The electronic park brake control module 134 receives as input the park switch state 138 and the transmission mode switch state 142. The electronic park brake control module 134 evaluates the park switch state 138 and the transmission mode switch state 142 to determine whether a condition has occurred in the mechanical linkage 126 between the range selection device 122 and the transmission 118. For example, the electronic park brake control module 134 compares the park switch state 138 to the transmission mode switch state 142. When the park switch state 138 indicates OTHER, the electronic park brake control module 134 determines that a condition cannot be determined and no control signals and/or message are generated.

When the park switch state 138 indicates PARK and the transmission mode switch state 142 indicates a state other than PARK, the electronic park brake control module 134 determines a condition and generates a control signal 146 to the electronic park brake system 113 and/or a message 144 that is communicated on a communication bus (not shown) to the electronic park brake system 133 indicating to activate the electronic park brake.

With reference now to FIG. 3, a flowchart is shown of a method 200 for preventing vehicle roll, in accordance with exemplary embodiments. The method 200 can be utilized in connection with the vehicle 100 of FIG. 1 and can be performed by control module of FIG. 2, in accordance with exemplary embodiments. As can be appreciated in light of the disclosure, the order of operation within the method is not limited to the sequential execution as illustrated in FIG. 3, but may be performed in one or more varying orders as applicable and in accordance with the present disclosure. As can further be appreciated, the method of FIG. 3 may be scheduled to run at predetermined time intervals during operation of the vehicle 100 and/or may be scheduled to run based on predetermined events.

As depicted in FIG. 3, the method may begin at 205. The park switch data 136 is received and the park switch state 138 is determined 210. The transmission mode switch data 140 is received and the transmission mode switch state 142 is determined at 220.

The park switch state 138 and the transmission mode switch state 142 are evaluated at 230-250. For example, if the park switch state 138 and the transmission mode switch state 142 do not indicate PARK at 230, the method continues at 205. If, however, at least one of the park switch state 138 and the transmission mode switch state 142 indicates PARK at 230, the method continues at 240.

At 240, if the park switch state 138 does not indicate PARK at 240, the method continues at 205. If, however, the park switch state 138 does indicate PARK at 240, and the transmission mode switch state 142 indicates PARK at 250, the method continues at 205. If however, the park switch state 138 does indicate PARK, and the transmission mode switch does not indicate PARK at 250, it is determined that a condition in the mechanical linkage exists at 260. One or more control signals 146 and/or messages 144 are generated to indicate a condition exists and/or to control the electronic park brake system 133 at 270. Thereafter, the method may end at 280.

As can be appreciated, the disclosed methods and systems may vary from those depicted in the Figures and described herein. For example, as mentioned above, the vehicle 100 of FIG. 1, and the control module 114 of FIGS. 1 and 2, and/or portions and/or components thereof may vary, and/or may be disposed in whole or in part in any one or more of a number of different vehicle units, devices, and/or systems, in certain embodiments. In addition, it will be appreciated that certain steps of the method 200 may vary from those depicted in FIG. 3 and/or described above in connection therewith. It will similarly be appreciated that certain steps of the method 200 may occur simultaneously or in a different order than that depicted in FIG. 3 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of preventing vehicle roll, the method comprising:

determining a first switch state based on data received from a park switch of a range selection device;

determining a second switch state based on data received from a transmission mode switch of the transmission;

diagnosing a fault of a mechanical linkage that couples the range selection device to the transmission by comparing the first switch state and the second switch state; and selectively generating at least one of a control signal to control an electronic park brake and a notification message based on the diagnosis.

2. The method of claim 1, wherein the diagnosing further comprises determining the fault of the mechanical linkage when the first switch state is different than the second switch state.

3. The method of claim 2, wherein the selectively generating comprises generating at least one of the control signal to apply the electronic park brake based on the determination.

4. A system for preventing roll of a vehicle, comprising:

at least two switch devices, wherein the first switch device is a park switch of a range selection device, and wherein the second switch device is a transmission mode switch of the transmission; and a control module that receives switch data from the at least two switch devices, that determines a first switch state based on the switch data from the first switch device, that determines a second switch state based on the data from the second switch device, that diagnoses a fault of a mechanical linkage that couples the range selection device to the transmission by comparing the first switch state and the second switch state, and that selectively generates at least one of a control signal to control an electronic park brake and a notification message based on the diagnosis.

5. The system of claim 4, wherein the control module determines the fault of the mechanical linkage when the first switch state is different than the second switch state.

6. The system of claim 5, wherein the control module selectively generates the control signal to apply the electronic park brake based on the determination.

7. A vehicle, comprising:

an automatic transmission having a transmission mode switch;

a range selection device having a park switch;

an electronic park brake system having an electronic park brake; and a control module that receives switch data from the transmission mode switch and the park switch, that determines a first switch state based on the switch data from the transmission mode switch, that determines a second switch state based on the data from the park switch, that diagnoses a fault of a mechanical linkage that couples the range selection device to the transmission by comparing the first switch state and the second switch state, and that selectively generates at least one of a control signal to control an electronic park brake and a notification message based on the diagnosis.

8. The vehicle of claim 7, wherein the control module determines the fault of the mechanical linkage when the first switch state is different than the second switch state.

9. The vehicle of claim 7, wherein the control module selectively generates the control signal to apply the electronic park brake based on the determination.

* * * * *